(12) United States Patent
Griesdorf et al.

(10) Patent No.: US 8,302,159 B2
(45) Date of Patent: Oct. 30, 2012

(54) METHOD AND SYSTEM FOR PROTECTING CONTENT IN A PROGRAMMABLE SYSTEM

(75) Inventors: Dustin Griesdorf, Waterloo (CA); Alan Rooks, Waterloo (CA); Jakob Nielsen, Waterloo (CA); Todd Schneider, Waterloo (CA)

(73) Assignee: Semiconductor Components Industries, LLC, Phoenix, AZ (US)

( * ) Notice: Subject to any disclaimer, the term of this patent is extended or adjusted under 35 U.S.C. 154(b) by 912 days.

(21) Appl. No.: 11/091,746

(22) Filed: Mar. 28, 2005

(65) Prior Publication Data

US 2005/0235354 A1    Oct. 20, 2005

(30) Foreign Application Priority Data

Mar. 30, 2004 (CA) ..................................... 2462495

(51) Int. Cl.
*G06F 21/00* (2006.01)
(52) U.S. Cl. ............................................................ 726/3
(58) Field of Classification Search .................. 713/189, 713/200, 183, 198, 193, 194; 711/163; 726/2, 726/17, 26, 27, 1; 381/60, 318
See application file for complete search history.

(56) References Cited

U.S. PATENT DOCUMENTS

| | | | | |
|---|---|---|---|---|
| 5,432,950 A * | 7/1995 | Sibigtroth | ...................... | 711/163 |
| 5,737,760 A | 4/1998 | Grimmer et al. | | |
| 6,115,478 A * | 9/2000 | Schneider | ...................... | 381/314 |
| 6,331,784 B1 | 12/2001 | Mason et al. | | |
| 6,499,092 B1 * | 12/2002 | Harwood et al. | .............. | 711/163 |
| 7,228,569 B2 * | 6/2007 | Barrenscheen | .................. | 726/34 |
| 7,242,777 B2 * | 7/2007 | Leenen et al. | .................... | 381/60 |
| 7,284,016 B2 * | 10/2007 | Venkatesh et al. | ............ | 707/200 |
| 7,284,106 B1 * | 10/2007 | Fernald | ......................... | 711/163 |
| 7,400,738 B2 * | 7/2008 | Niederdrank et al. | ......... | 381/318 |
| 2001/0055404 A1 * | 12/2001 | Bisgaard | ........................ | 381/314 |
| 2001/0056539 A1 | 12/2001 | Pavlin et al. | | |
| 2002/0122562 A1 * | 9/2002 | Brennan et al. | ............... | 381/316 |
| 2003/0014653 A1 | 1/2003 | Moller et al. | .................. | 713/193 |
| 2003/0135706 A1 * | 7/2003 | Lin et al. | ....................... | 711/163 |
| 2003/0177373 A1 * | 9/2003 | Moyer et al. | ................... | 713/189 |
| 2003/0212897 A1 * | 11/2003 | Dickerson et al. | ............ | 713/200 |
| 2004/0156516 A1 * | 8/2004 | Mortensen | ..................... | 381/312 |
| 2005/0108488 A1 | 5/2005 | Rohm et al. | | |

FOREIGN PATENT DOCUMENTS

| | | |
|---|---|---|
| WO | WO 98/30958 | 7/1998 |
| WO | WO 98/30958 A1 * | 7/1998 |
| WO | 98/47314 A2 | 10/1998 |
| WO | 03/027815 A2 | 4/2003 |

OTHER PUBLICATIONS

EP Search Report, EP Application No. 10011274.7-2212, mailed Jul. 1, 2011.

* cited by examiner

*Primary Examiner* — Jeffrey Pwu
*Assistant Examiner* — Hee Song

(57) ABSTRACT

Method and system for protecting content in a programmable system is provided. The system is connectable to an external device through one or more access ports. Content protection method/manager is implemented by assigning one or more access modes to the access port and switching the access modes. In response to a current access mode, the content protection method/manager restricts visibility of the system to the external device via the access port.

11 Claims, 3 Drawing Sheets

METHOD AND SYSTEM FOR PROTECTING CONTENT IN A PROGRAMMABLE SYSTEM

CROSS-REFERENCE TO RELATED APPLICATIONS

This application claims priority from Canadian Patent Application No. 2,462,495, filed on Mar. 30, 2004.

FIELD OF INVENTION

The present invention relates to a signal processing technology, and more particularly, to a method and system for protecting content stored in a programmable encapsulated system.

BACKGROUND OF THE INVENTION

Digital hearing aids have been developed in recent years. For example, in hearing aids for "In-The-Ear" (ITE) and "Behind-The-Ear" (BTE) applications, an incoming audio signal is processed according to processing scheme and subsequently transmitted to the user of the hearing aid through a hearing aid loud speaker (i.e., hearing aid receiver). The processing scheme, which is used to process the incoming audio signal and to produce the processed, outgoing signal, represents the nucleus of the signal improvement which the hearing aid user experiences. This improvement may be increased speech intelligibility. Thus, the processing scheme represents methods and core knowledge proprietary to the individual hearing aid manufacturer who has developed the methods and knowledge for the application. These methods and knowledge are often referred to as algorithms.

An algorithm can be considered as a sequence of actions that need to be carried out to fulfill a task. In the case of digital hearing aids, an algorithm is a sequence of instructions that manipulate the incoming signal in addition to other processing, such as control, in order to produce an outgoing signal that generally represents an enhancement of the incoming signal. This enhancement is beneficial for the hearing impaired person who wears the hearing aid.

The digital hearing aid contains a programmable processing module called a hybrid. The hybrid is an encapsulated entity that includes integrated circuits, a circuit that connects the integrated circuits, and passive components.

The hearing aid has a connector through which the hearing aid is connected to an external fitting device. The external fitting device is connected to a PC (Personal Computer) or similar device in which fitting data is generated. The hearing aid connector is connected internally in the hearing aid to the access port of the hybrid. Data is downloaded from the PC to the integrated circuits in the hybrid through the access port.

The hybrid serves as the basis for multiple hearing aids developed by different manufacturers. In other words, one hybrid can execute a multitude of algorithms due to the flexibility and programmability that comes with an open platform type of processing system. Open platform in this context means the ability to develop and execute a multitide of algorithms as described above. For example, two competing hearing aid manufacturers, who use the same type of hybrid originating from a common vendor, can execute two or more completely different algorithms in the hearing aids. Currently available open hybrid(s) do not prevent access to the embedded application code from an external device. Thus, it is possible to gain unauthorized access to application code in a hybrid, for purposes of reverse engineering or to deploy the code in another hybrid.

There is a need to provide a method and system for protecting any critical content stored in a programmable system.

SUMMARY OF THE INVENTION

It is an object of the invention to provide a method and system that obviates or mitigates at least one of the disadvantages of existing programmable systems.

The invention uses mode-based operation for accepting or restricting commands from an external device to allow a programmable system to be visible or invisible from the external device.

In accordance with an aspect of the present invention, there is provided a method of protecting content embedded in a programmable system. The system includes at least one Application Specific Integrated Circuit (ASIC) executing an application, and a non-volatile (NV) storage element storing information on the application. The ASIC and the NV storage element are encapsulated inside the system. The method includes the steps of: (1) assigning at least one of a plurality of access modes to at least one access port, the access modes including at least an unrestricted access mode and a restricted access mode; (2) in the unrestricted access mode, accepting one or more access port commands provided by an external device through the access port, including the step of: in response to an access port command, allowing a content stored in the system to be visible to the external device via the access port; (3) in the restricted access mode, accepting a limited set of access port commands provided by the external device through the access port, including the step of: in response to an access port command, restricting visibility of the content, (4) switching the restricted access mode to the unrestricted access mode without exposing the content to the external device via the access port.

In accordance with a further aspect of the present invention, there is provided a programmable system for implementing an application and being accessible from an external device via at least one access port. The system includes: (1) at least one Application Specific Integrated Circuit (ASIC) executing an application; (2) a non-volatile (NV) storage element storing information on the application; (3) a housing for encapsulating the ASIC and the NV storage element inside the system; and (4) a content protection manager adapted for: assigning at least one of a plurality of access modes to the access port, the access modes including at least an unrestricted access mode and a restricted access mode; in the unrestricted access mode, allowing a content stored in the system to be visible to the external device via the access port; in the restricted access mode, restricting visibility of the content to the external device via the access port; and switching the restricted access mode to the unrestricted mode without exposing the content to the external device via the access port.

This summary of the invention does not necessarily describe all features of the invention. Other aspects and features of the present invention will be readily apparent to those skilled in the art from a review of the following detailed description of preferred embodiments in conjunction with the accompanying drawings.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENTS OF THE INVENTION

The embodiment of the present invention is now described for a hybrid in a hearing aid. However, the present invention may be applied to different types of devices, such as but not limited to, listening devices (e.g. headsets), any other programmable systems in which one or more elements are embedded and are encapsulated within the systems.

In the embodiment, an entity is defined as a block of elements inside an Application Specific Integrated Circuit (ASIC). In the embodiment, an element is defined as a specific functionality inside an entity. For example, a memory block inside a Digital Signal Processor (DSP) is considered as an element, while the DSP itself is considered as an entity.

Figure 1:
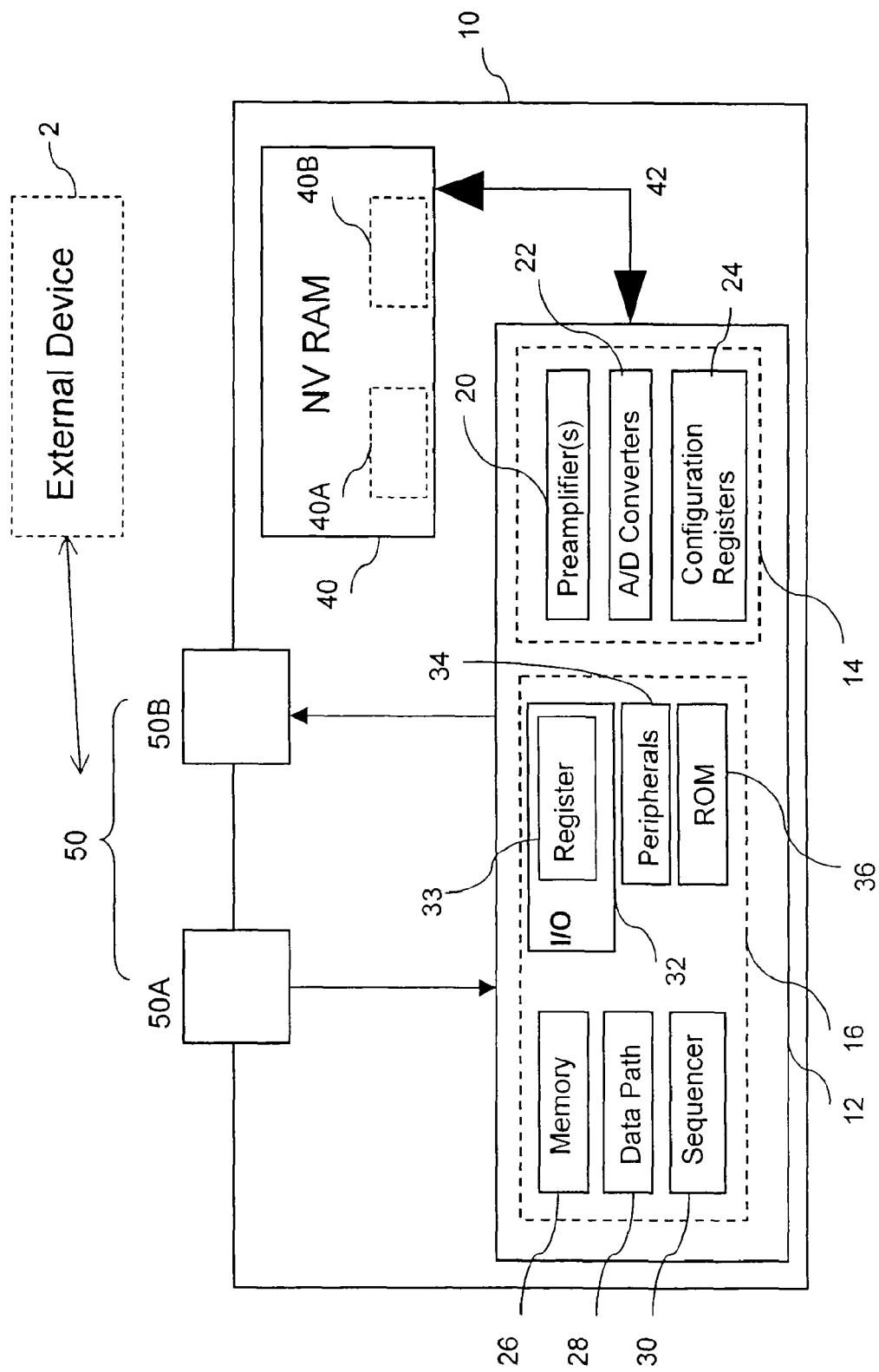
FIG. 1 is a schematic diagram showing a hybrid to which a content protection in accordance with an embodiment of the present invention is suitably applied.

FIG. 1 shows a hybrid 10 to which a content protection in accordance with an embodiment of the present invention is suitably applied. The hybrid 10 includes an ASIC 12 that has analog circuitry and one or more digital signal processors (DSPs) and/or coprocessors. In FIG. 1, one analog circuitry 14 and one DSP 16 are integrated into one ASIC 12. However, analog circuitry and one or more DSPs/coprocessors may be implemented on multiple ASICs.

The DSP(s) and/or coprocessor(s), and the analog circuitry in the ASIC 12 are accessible through one or more access ports (external pads) 50 located on the accessible outside of the hybrid 10.

The analog circuitry 14 contains a plurality of elements, e.g., preamplifier(s) 20, analog to digital (A/D) converter(s) 22, and configuration registers 24.

The DSP 16 contains a plurality of elements, e.g., a memory 26, a data path 28, a sequencer 30, an Input/Output (I/O) unit 32, peripherals 34, and a Read-Only-Memory (ROM) 36. The memory 26 is used for storage of application code and temporary data during normal hearing aid operation. In the data path 28, mathematical calculations are carried out during normal hearing aid operation. The sequencer 30 fetches, decodes and executes application code from the memory 26. The I/O unit 32 handles information interchange with external devices (e.g., 2 of FIG. 1). The I/O unit 32 includes a register 33. The register 33 stores a command coming from the access port 50 or a response submitted from the DSP 16. The peripherals 34 serve a multitude of purposes, for example, for ensuring system sanity during operation. The ROM 36 has a plurality of functions and encompasses functions to control the state and the execution of tasks from a hybrid access port as described below.

In the embodiment, a command, which is provided from the external device 2 and is received at the access port 50, is referred to as access port command.

The hybrid 10 includes a non-volatile (NV) storage element 40. The NV storage element 40 stores data, such as application code, fitting information, information relevant to a specific hearing aid application. The DSP 16 executes algorithms represented by the application code during normal hearing aid audio processing (operation). The fitting information is used to configure the algorithm in order to provide the signal enhancement for the hearing impaired user. The fitting information is different for each user, and is stored on a per-user basis.

In FIG. 1, a NV Random Access Memory (RAM) is shown as the NV storage element 40. The NV RAM may be an Electrically Erasable Programmable ROM (EEPROM) or a flash Random Access Memory (RAM), but is not limited to any of these two devices. In FIG. 1, the NV storage element 40 is shown separately from the ASIC 12. However, the NV storage element 40 may be embedded in the ASIC 12.

Information is interchanged between the NV storage element 40 and the ASIC 12 over wires or other connection scheme internally in the hybrid 10. In FIG. 1, "42" represents the wires or other internal connection scheme. The wires 42 are embedded inside the hybrid 10 so that the wires 42 cannot be probed at any point visible from the outside of the hybrid 10. When the NV storage element 40 is embedded in the ASIC 12, the connection between the NV storage element 40 and the analog circuitry 14 or any DSP 16 is embedded inside the ASIC 12.

An external device 2 is capable of communicating with the hybrid 10 through the access port 50. The external device 2 may be a PC (Personal Computer). External devices other than the PC may be connected to the hybrid 10 through the access port 50. In FIG. 1, two access ports 50A and 50B are shown. The access port 50A is provided for receiving an input from the external device 2. The access port 50B is provided for transmitting an output to the external device 2. The elements of the DSP 16 and the configuration registers 24 inside the analog circuitry 14 are accessible through the access port 50. The access ports 50A and 50B may connect to the I/O unit 32 of the DSP 16.

More than two access ports may be provided to the hybrid 10. For example, the access ports 50 may include a debug port for debugging. The number of access ports related to communication as well as the type of communication conducted may vary, and are not limited to those of 50A and 50B.

Data are interchanged between the external device 2 and the DSP 16. The data transferred between the external device 2 and the hybrid 10 (and vice versa) through the access port 50 include, such as application code, fitting information or any other information.

The NV storage element 40 is not directly connected to any one of the access ports (50A, 50B). Access to the NV storage element 40 from the external device 2 is implemented through the connection between the access port 50 and the ASIC 12 (such as the DSP 16).

The hybrid 10 includes mechanism or algorithm for implementing content protection. The content protection may be implemented by software, hardware, or a combination thereof (referred to as content protection manager or content protection method). In the description below, the term "the content protection method" is used. The content protection method is provided to protect contents stored in a certain region(s) of one or more elements in the hybrid 10 from unauthorized access through the access port 50.

The content protected by the content protection method is referred to as protected content(s). The protected content includes application code, such as application code for a specific hearing aid application. The protected content may include information stored in the hybrid 10 other than the application code.

For example, the memories and registers in the DSP 16, the configuration registers 24 in the analog circuitry 14 and the NV storage element 40 may store protected contents. An element, which stores a protected content, is referred to as a protected element. The protected element may include a protected region and an unprotected region. The protected region is protected by the content protection method. Any access to the protected region is managed by the content protection method. The unprotected region is accessible in restricted access mode. The access to the unprotected region when in unrestricted access mode is described below. For example, the NV storage element 40 may have a protected region 40A and an unprotected region 40B as shown in FIG. 1.

The content protection method is now described in detail. The content protection method allows an individual to configure a hybrid over its access port 50 without providing the ability for that individual to access proprietary application code. The content protection method ensures that any critical content (i.e., any protected content) cannot be copied, viewed, altered (except deleted) or otherwise accessed by an unauthorized individual, such as an individual involved in developing a competing product or other. Deleting the protected content may be allowed since it does not expose the protected contents to the external device 2. Any unauthorized individual (access) cannot obtain knowledge about algorithms executed in the hybrid 10.

The content protection method allows the hybrid 10 to be re-furbished or in another way be re-conditioned by an authorized individual who owns the application code. For example, in the case of the return of a defect part, the hybrid 10 can be re-furbished or re-conditioned by the manufacturer who owns the application code.

In the embodiment, the content protection method is implemented by assigning one of operation modes to the access port 50, and switches the operation modes. The operation modes include unrestricted access mode and restricted access mode.

In unrestricted access mode, the external device 2 is allowed to access the ASIC 12 and the NV storage element 40 within the natural limitations of the actual implemented hardware.

In restricted access mode, the access to the ASIC 12 and the NV storage element 40 is limited. Only a subset of elements in the ASIC 12 and the NV storage element 40 is "visible" from the external device 2 through the access port 50.

Once the access mode is switched from unrestricted access mode to restricted access mode, the protected element (protected region) becomes invisible from the external device 2 through the access port 50. No one can review the protected elements. If the protected element has a protected region and an unprotected region, the protected region is invisible from the external device 2 while the unprotected region is visible from the external device 2 within the limitations of the actual implemented hardware.

The content protection method allows the access port 50 to be switched from restricted access mode to unrestricted access mode without exposing the protected content. When switching restricted access mode to unrestricted access mode, protected contents are cleared, or are obfuscated.

The access mode is selected by setting a bit in a register 24. If the bit is "0", unrestricted access mode is selected. If the bit is "1", restricted access mode is selected.

Unrestricted access mode is now described in detail. In unrestricted access mode, the access port commands are executed through built-in functionality embedded in the hybrid 10. For example, the built-in functionality is embedded in the ROM 36, a ROM in the access port 50, or a combination thereof.

In unrestricted access mode, all access port commands are executable. There are no restrictions on subsets of access port commands that will not result in the specified functionality.

The specifics of operating the access port 50 in unrestricted access mode relate to the set of access port commands that can be executed.

In unrestricted access mode, entities inside the hybrid 10 are visible. The content stored in the ASIC 12, such as, memories, ROM, data path registers, can be read or written through the access port 50. A read or write operation is performed by transmitting associated access port commands from the external device 2. For example, the external device 2 may transmit a read-from-memory command, and the DSP 16 may return the content of the requested memory address in response to that command. Similarly, the external device 2 may transmit a write-to-memory-at-address-X command, which is followed by the sequence of data/application code to be written to a memory at address X in the hybrid 10.

In unrestricted access mode, the NV storage element 40 is accessible from the external device 2 through the access port 50 such that contents can be read from the NV storage element 40 and/or can be written to the NV storage element 40. When the access port 50A receives access port commands associated with access to the NV storage element 40, the access port 50 may call function(s) in the ROM 36, which handle read or write to the NV storage element 40. The DSP 16 may return requested data to the access port 50B in case of a read command, or the DSP 16 may write transmitted data in case of a write command.

The access port 50A may directly access the NV storage element 40 using its built-in functionality without calling function(s) in the ROM 36. For example, the access port 50 has executable access function(s) embedded into it for directly accessing the NV storage element 40, and has a DSP executing the called functions in its built-in functionality or other part of the NV storage element 40 where the command set is stored (not shown). The access port 50 may include a ROM for the built-in functionality. The call is executed directly from the I/O unit 32. The NV storage element 40 then provides a response directly to the register 33 in the I/O unit 32, which is read by the access port 50.

Restricted access mode is now described in detail. In restricted access mode, certain application code (e.g., application code for processing audio signal, application code for looking at the shared register 33 and determining how to deal with a command) assesses and handles the execution of access port commands.

In restricted access mode, entities inside the hybrid 10 are invisible from the external device 2. Contents cannot be directly written on the ASIC 12 (e.g., memories, ROM, data path registers) from the access port 50 or cannot be read through the access port 50.

Any access mode commands associated with reading from any protected element (or any protected region) and writing to any protected element (or any protected region) are not executed. The built-in functions associated with reading and writing executed to the protected element are disabled.

No response is returned through the access port 50 in restricted access mode. It may return a dummy response that is not associated with the given access port command. The dummy response may be a message associated with an access port command other than an access port command using call-functions in the ROM for reading or writing.

For example, when the hybrid 10 receives a read-from-memory-at-address-X command from the external device 2 via the access port 50, the hybrid 10 may return a response that has nothing to do with the requested data.

Similarly, write commands are not executed from the access port 50. If writing is allowed, an unauthorized individual could write a small piece of code to memory over the access port 50 that would result in application code being returned to the access port 50 upon execution of this piece of code. Thus, in restricted access mode, the hybrid 10 does not accept from the external device 2 any requests associated with reading writing executed to the protected element (or the protected region).

In one embodiment, all contents stored in the NV storage element 40 are protected in restricted access mode. Access port commands for writing to the NV storage element 40 and for reading from the NV storage element 40 are not executed.

A limited set of information, such as fitting data and other information, may be storable and assessable in restricted access mode. In this case, it only allows a single part of an element, such as a register 33 in the I/O unit 32, to be "shared" between the access port 50 and the DSP that executes commands appearing on the access port 50. An access port command that arrives in the register 33 results in the running application code to interpret this access port command and subsequently "jump" to the part of the application code that is associated with executing this particular access port command.

In restricted access mode, certain ROM functions in the hybrid 10, which are irrelevant to accessing application code or other critical information, are callable from the access port 50. It depends on the application code to decide which memory cells and NV RAM parts can be read or written. These cells and NV RAM parts may contain fitting and/or certain critical information.

Figure 2:
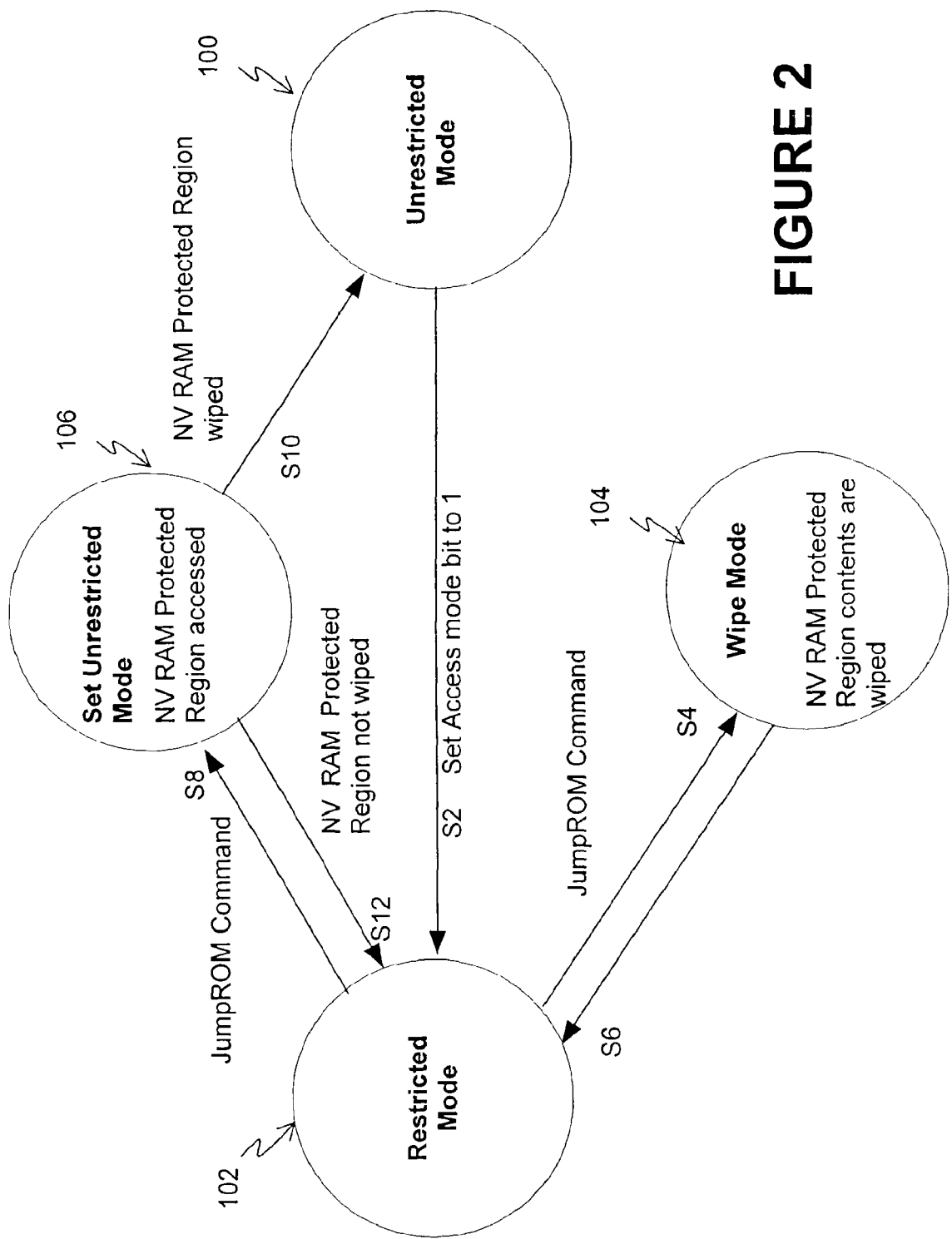
FIG. 2 is a flow diagram showing an example of the states associated with the content protection of FIG. 1.

FIG. 2 shows an example of the states associated with the content protection of FIG. 1. In FIG. 2, "JumpROM" command refers to the event that has the access port command jump into a location in the ROM (e.g., 36) from which a given command is executed. The I/O unit 32 contains the JumpROM command. In FIG. 2, the NV storage element (e.g., 40 of FIG. 1) is referred to as NV RAM. The hybrid 10 includes an access mode control register for recording the current access mode. The control register can be configured for restricted access mode or unrestricted access mode by means of an access mode bit. An access mode bit equal to "1" indicates restricted access mode. An access mode bit equal to "0" indicates unrestricted access mode. It is assumed that the access port 50 is operating in unrestricted access mode, i.e., an Unrestricted access mode state 100.

When an access control bit in the access mode control register is set to "1" by an access port command, the Unrestricted access mode state 100 is changed to a Restricted access mode state 102 (S2).

At the Restricted access mode state 102, in response to a JumpROM command delivered from the external device 2 to the access port 50, a Wipe mode state 104 (step S4) or a Set Unrestricted mode state 106 (step S8) is entered.

If the JumpROM is associated with wiping the protected contents stored in the protected region (e.g., 40A of FIG. 1), the state is switched to the Wipe mode state 104. At the Wipe mode state 104, the protected contents stored in the protected region are wiped. After wiping the contents, the access port 50 turns to be in the Restricted access mode state 102 (S6).

If the JumpROM is associated with entering Set Unrestricted mode, the state is switched to the Set Unrestricted mode state 106.

At the Set Unrestricted mode state 106, the access port 50 turns to be in the Unrestricted access mode state 100 (step S10) or in the Restricted access mode state 106 (S8).

Unrestricted mode is entered from the Set Unrestricted mode (S10), if the NV RAM protected region has been wiped.

Further, the access mode bit is set to "0". Restricted mode is entered (S12), if the NV RAM protected region has not been wiped.

For example, during the development of application code, unrestricted access mode is assigned to the access port 50 such that the hybrid 10 accepts full set of access port commands from the external device 2. The developer is capable of obtaining full access to the hybrid 10 to debug his application.

For example, during the manufacturing process of the hybrid 10, restricted access mode is assigned to the access port 50 such that the hybrid 10 accepts a limited set of access port commands from the external device 2. The limited set of access port commands may include access port commands for configuration and for switching the access mode. Any access port commands for accessing the protected contents are rejected.

The examples of the application scenarios are now described. In the following scenarios, the term "a command" covers "one command" and "multiple commands". It is noted that the situation to which the content protection method is applied is not limited to the following scenarios.

Scenario 1: In order to assert the state of the hybrid 10 over the access port 50, an individual may transmit an access port command to the access port 50 followed by the access port 50 making a call to the ROM 36 from where this command is executed. If the access port 50 is in unrestricted access mode, all aspects of the state of the hybrid 10 may be returned. If the access port 50 is in restricted access mode, the aspects of the state that relate to the content of memories 26, registers 24 and NV storage element 40 are not returned.

Scenario 2: In order to write fitting parameters to the hybrid 10, an individual may transmit an access port command to the access port 50 followed by the access port 50 making a call to the ROM 36 from where this command is executed. In the case of fitting, the execution of the ROM 36 results in the ASIC 12 "looking for" data on the access port 50, converts the information to a format suitable for writing into the NV storage element 40, and performs actual write operation. This applies for both unrestricted access mode and restricted access mode.

Scenario 3: An individual needs to interrupt the execution of the program running on the hybrid 10 (regardless of what state this program is in) to pass control information to the DSP 16 (or other entity) in order to initiate EEPROM write or for any other purpose. In this case, the command appearing on the access port 50 results in the DSP 16 stopping followed by a call to the ROM 36.

Scenario 4: In order to access the hybrid 10, an individual may transmit an access port command to the access port 50 followed by the access port 50 making a call to the ROM 36 from where the command is executed. For each command in the ROM 36, the command itself asserts whether the access port 50 is in unrestricted access mode or restricted access mode, and executes accordingly. As described above, information, which is written into the hybrid 10, is limited in restricted access mode.

Scenario 5: In order to write a piece of information to the NV storage element 40, an individual may transmit an access port command to the access port 50 followed by the access port 50 making a call to the ROM 36 from where the command is executed. The ROM 36 handles all tasks related to writing to the NV storage element 40. This functionality applies for both unrestricted access mode and restricted access mode. In restricted access mode, information, which is written into the hybrid 10, is limited.

Scenario 6: In order to write a piece of information to a memory other than the NV storage element 40, an individual may transmit an access port command to the access port 50 followed by the access port 50 making a call to the ROM 36 from where the command is executed. The ROM 36 handles all tasks related to writing to the memory. This functionality applies for both unrestricted access mode and restricted access mode. In restricted access mode, information, which is written into the hybrid 10, is limited.

Scenario 7: In order to assess whether the NV storage element 40 is correctly connected to the ASIC 12 inside the hybrid 10, an individual may transmit an access port command to the access port 50 followed by the access port 50 making a call to the ROM 36 from where the command is executed. The ROM 36 verifies the connection by initially setting a bit in a register on the NV storage element 40; reading and verifying that the bit is set; resetting the bit; and reading and verifying that the bit is reset. This functionality applies for both unrestricted and restricted access mode.

Scenario 8: In order to read the content of the NV storage element 40 or a part hereof, an individual may transmit an access port command to the access port 50 followed by the access port 50 making a call to the ROM 36 from where the command is executed. The ROM 36 handles all tasks related to reading from the NV storage element 40. The information returned to the individual over the access port 50 depends on the access mode.

Figure 3:
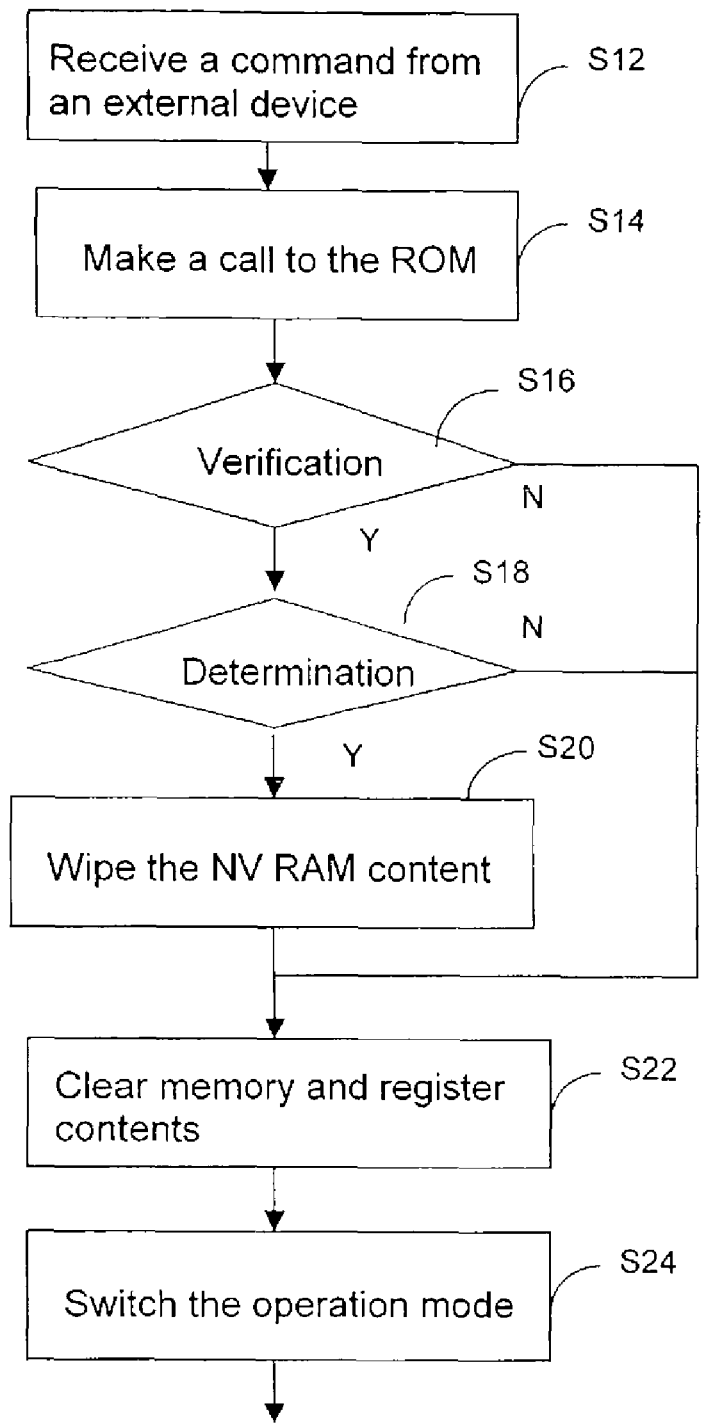
FIG. 3 is a flow diagram showing an example of the operation for switching an access mode.

Scenario 9: FIG. 3 shows one example of the operation for switching restricted access mode to unrestricted access mode. Referring to FIG. 3, in order to switch restricted access mode to unrestricted access mode, an individual may transmit an access port command to the access port 50 (step S12) followed by the access port 50 making a call to the ROM 36 (step S14) from where the command is executed. The execution of this command results in a number of tasks being executed. For example, the presence of the NV storage element 40 is verified (step S16). If the NV RAM 40 is present, it is determined whether application code is stored on the NV RAM 40 (step 18). When the application code is stored on the NV RAM 40, the NV RAM content is wiped (step S20). The memory and register content in the ASIC 12 is cleared (step S22). Then, the access mode is switched to unrestricted access mode, and the full access port command set is enabled (S24). Protected contents embedded in the ASIC 12 and the NV RAM 40 are not exposed to the outside of the hybrid 10.

Scenario 11: A manufacturer may have his command sequence that can be executed over the access port 50 to switch restricted access mode to unrestricted access mode for the return of a defect part or debugging. This command sequence is not public and is only known to the manufacturer.

Scenario 12: For the return of a defect part or debugging, all contents may be wiped before switching the access mode and re-configuring the hybrid 10.

The embodiment of the present invention allows an individual to configure a hybrid over its access port without providing the ability for that individual to access proprietary application code. In the case of the return of a defect part, the hybrid is re-furbished or in another way re-conditioned by a manufacturer who owns the application code.

The embodiment of the present invention allows for a physical access port, and an associated communication protocol to be common for different hearing aid manufacturers A and B without the manufacturer A having access to the "part" of the DSP inside the hybrid that encompasses the application code (and vice versa).

The embodiment of the present invention allows each hearing aid manufacturer to get access to his hybrid during manufacturing, hearing aid fitting or refurbishing in case of a field return.

The embodiment of the present invention allows each hearing aid manufacturer to get full access to his hybrid during application development followed by the ability "lock" the hybrid, i.e. restricted access mode, at the end of the development cycle and before launching a product on the market that encompasses this hybrid.

The embodiment of the present invention is applicable to any on-system Intellectual Property (IP), and prohibits an unauthorized access to that IP.

The present invention has been described with regard to one or more embodiments. However, it will be apparent to persons skilled in the art that a number of variations and modifications can be made without departing from the scope of the invention as defined in the claims.

What is claimed is:

1. A digital hearing aid comprising:
    an input/output (I/O) connection for receiving input commands from an external device and providing output information to the external device;
    a non-volatile (NV) memory for storing audio-enhancing algorithm instructions and one or more parameter values for use by the audio-enhancing algorithm; and
    a digital signal processor (DSP) coupled between the I/O connection and the NV memory, the DSP for processing a signal according to the audio-enhancing algorithm and the one or more parameter values stored in the NV memory, the DSP further configured to prevent unauthorized access to the audio-enhancing algorithm instructions stored in the NV memory through the I/O connection by controlling access to the NV memory in each of a plurality of modes of operation of the DSP, the DSP comprising:
    a processing core for executing instructions; and
    a memory for storing DSP instructions for execution by the processing core, the DSP instructions when executed by the processing core configuring the DSP to operate in one of the plurality of modes to prevent unauthorized access to the audio-enhancing algorithm instructions, the modes comprising:
        an un-restricted access mode for writing the audio-enhancing algorithm instructions to the NV memory is response to one or more input commands received over the I/O connection; and
        a restricted access mode for writing the one or more parameter values to the NV memory and for executing the audio-enhancing algorithm instructions;
    the DSP instructions further comprising mode switching instructions for switching the operation mode from the restricted access mode to the un-restricted access mode, the mode switching instructions when executed by the processing core further configuring the DSP to prevent the audio-enhancing algorithm instructions from being output to the I/O connection once the DSP has been operated in the restricted access mode by preventing the operation mode switch when the audio-enhancing algorithm instructions have not been wiped from the NV memory if the access is unauthorized.

2. The digital hearing aid of claim 1, wherein the mode switching instructions prevent the audio enhancing algorithm instructions from being output to the I/O connection by deleting the audio enhancing algorithm instructions from the NV memory prior to switching to the un-restricted operation mode.

3. The digital hearing aid of claim 1, wherein the mode switching instructions prevent the audio enhancing algorithm instructions from being output to the I/O connection by obfuscating the audio enhancing algorithm instructions prior to switching to the un-restricted access mode.

4. The digital hearing aid of claim 1, wherein the DSP further comprises an access mode register for storing a flag indicating the access mode of the DSP.

5. The digital hearing aid of claim 4, wherein the mode switching instructions set the access mode register indicating that the access mode has been changed from the restricted access mode to the un-restricted access mode, the DSP configured to prevent the audio-enhancing algorithm instructions from being output to the I/O connection by providing dummy output information to the I/O connection in response to a read input command when operating in the un-restricted access mode.

6. The digital hearing aid of claim 1, wherein the NV memory is coupled to the DSP over one or more signal lines physically protected from external access.

7. The digital hearing aid of claim 1, further comprising:
   a digital-to-analog converter for converting the processed signal into an analog signal;
   one or more amplifiers for amplifying the analog signal; and
   a speaker for producing a sound corresponding to the amplified analog signal.

8. The digital hearing aid of claim 1, wherein the DSP is provided on an application specific integrated circuit (ASIC).

9. The digital hearing aid of claim 8, wherein the ASIC further comprises the NV memory coupled to the DSP by one or more signal lines physically protected from external access.

10. The digital hearing aid of claim 9, wherein the ASIC further comprises:
    a digital-to-analog converter for converting the processed signal into an analog signal; and
    one or more amplifiers for amplifying the analog signal.

11. The digital hearing aid of claim 9, further comprising a speaker for producing a sound corresponding to the amplified analog signal.

* * * * *